US009381450B2

(12) United States Patent
Lang et al.

(10) Patent No.: US 9,381,450 B2
(45) Date of Patent: Jul. 5, 2016

(54) DEFOAMER COMPOSITION COMPRISING ALKOXYLATED 2-PROPYLHEPTANOL

(75) Inventors: Adrian Lang, Göteborg (SE); Mahnaz Company, Hisings Backa (SE)

(73) Assignee: AKZO NOBEL N.V., Arnhem (NL)

(*) Notice: Subject to any disclaimer, the term of this patent is extended or adjusted under 35 U.S.C. 154(b) by 708 days.

(21) Appl. No.: 13/140,284

(22) PCT Filed: Dec. 14, 2009

(86) PCT No.: PCT/EP2009/067018
§ 371 (c)(1),
(2), (4) Date: Aug. 11, 2011

(87) PCT Pub. No.: WO2010/069898
PCT Pub. Date: Jun. 24, 2010

(65) Prior Publication Data
US 2011/0294899 A1    Dec. 1, 2011

Related U.S. Application Data

(60) Provisional application No. 61/146,366, filed on Jan. 22, 2009.

(30) Foreign Application Priority Data

Dec. 18, 2008  (EP) ................................. 08172063

(51) Int. Cl.
| | | |
|---|---|---|
| C11D 3/48 | (2006.01) | |
| C11D 9/50 | (2006.01) | |
| C11D 1/66 | (2006.01) | |
| A01N 25/34 | (2006.01) | |
| A01N 33/02 | (2006.01) | |
| A01N 25/00 | (2006.01) | |
| A61K 31/13 | (2006.01) | |
| C11D 3/02 | (2006.01) | |
| C11D 3/00 | (2006.01) | |
| C08L 93/00 | (2006.01) | |
| C09D 105/00 | (2006.01) | |
| C09J 105/00 | (2006.01) | |
| B01D 19/04 | (2006.01) | |

(52) U.S. Cl.
CPC .................................. B01D 19/0404 (2013.01)

(58) Field of Classification Search
CPC ....................... B01D 19/0404; B01D 19/0422
USPC .......... 514/674, 777; 510/470, 356, 108, 513, 510/391, 319
See application file for complete search history.

(56) References Cited

U.S. PATENT DOCUMENTS

| 5,705,476 A | 1/1998 | Hoffarth |
| 5,856,290 A | 1/1999 | van Buskirk et al. |
| 6,001,790 A | 12/1999 | Schmitt et al. |
| 6,015,839 A | 1/2000 | Milius |
| 6,337,352 B1 | 1/2002 | Milius |
| 6,562,875 B1 | 5/2003 | Corbel et al. |
| 6,610,248 B1 * | 8/2003 | Lichtenberg ........... A01N 33/04 210/764 |
| 7,387,990 B2 | 6/2008 | Dettmann et al. |
| 2005/0215452 A1 | 9/2005 | Ruland et al. |
| 2007/0197422 A1 * | 8/2007 | Dettmann ............... A01N 33/12 510/504 |

FOREIGN PATENT DOCUMENTS

| DE | 3018173 C2 | 11/1981 |
| EP | 0343605 | 11/1989 |
| EP | 0620270 | 10/1994 |
| EP | 0 681 865 A2 | 11/1995 |

(Continued)

OTHER PUBLICATIONS

European Search Report for EP Application No. 08172063.3; Completion date May 5, 2009.
International Search Report for PCT Application No. PCT/EP2009/067018; Completion date Feb. 19, 2010.
Derwent Abstract of German Patent Publication No. DE3018173, 1981.
English Abstract of JP2004-217779.
Japanese Patent Application No. 2011-541367 Office Action dated Dec. 18, 2012.

(Continued)

*Primary Examiner* — Uma Ramachandran
*Assistant Examiner* — Sreeni Padmanabhan
(74) *Attorney, Agent, or Firm* — Matthew D. Kellam

(57) ABSTRACT

The present invention relates to defoaming compositions comprising compounds having the formula $C_5H_{11}CH(CH_2CH_2CH_3)CH_2O(CH_2CH(X)O)_nH$ (I) where $X=(CH_2)_aCH_3$ where a=0 or 1 and where n=0.5-5; and one or more hydrotropes selected from the group consisting of branched or linear C4-C10 alkyl glycosides and optionally one or more anionic hydrotrope selected from the group consisting of fatty acid soaps where the acyl group contains 10-22 carbon atoms, and which could be saturated or unsaturated, linear or branched; or a sulfonate chosen from the group cumene sulfonate and xylene sulfonate, and the use of such compositions as defoaming and/or antifoaming agents. The invention also pertains to a composition comprising a) a compound $C_5H_{11}CH(CH_2CH_2CH_3)CH_2O(CH_2CH(X)O)_nH$ (I) where $X=(CH_2)aCH_3$ where a=0 or 1 and n=0.5-5 b) one or more hydrotrope selected from the group consisting of branched or linear C4-C10 alkyl glycosides, c) optionally one or more anionic hydrotrope selected from the group consisting of fatty acid soaps where the acyl group contains 8-22, preferably 9-18 carbon atoms, and which could be saturated or unsaturated, linear or branched; or a sulfonate chosen from the group cumene sulfonate and xylene sulfonate, and d) N,N-bis(3-aminopropyl)dodecylamine.

4 Claims, No Drawings

(56) References Cited

FOREIGN PATENT DOCUMENTS

| | | |
|---|---|---|
| EP | 1 591 466 A1 | 11/2005 |
| JP | 2004-217779 A | 8/2004 |
| JP | 2007224298 A | 9/2007 |
| WO | 91/14760 | 10/1991 |
| WO | 94/11331 | 5/1994 |
| WO | WO 99/21948 | 5/1999 |
| WO | WO 03/091191 A1 | 11/2003 |
| WO | WO 03/091192 A1 | 11/2003 |
| WO | WO 2004/033403 A1 | 4/2004 |
| WO | WO 2004/099355 A1 | 11/2004 |

OTHER PUBLICATIONS

Notice of Opposition filed Mar. 3, 2014 by BASF SE against corresponding European patent No. 2379479B1.
Machine translation of WO 1991/014760.
Machine translation of EP 0343605.
Decision rejecting Opposition issued in counterpart European Application No. 09 768 082.1 dated Oct. 14, 2015 (15 pages).

* cited by examiner

DEFOAMER COMPOSITION COMPRISING ALKOXYLATED 2-PROPYLHEPTANOL

This case was filed under the Patent Cooperation Treaty on Dec. 14, 2009 and claims priority of EP application No. 08172063.3 filed on Dec. 18, 2008, and U.S. provisional application No. 61/146,366 filed Jan. 22, 2009.

TECHNICAL FIELD OF THE INVENTION

The present invention relates to the use of a composition comprising 2-propylheptanol alkoxylates and hydrotropes as a defoaming agent for compositions comprising N,N-bis(3-aminopropyl)dodecylamine, and to a defoaming composition comprising said 2-propylheptanol and hydrotropes.

TECHNICAL BACKGROUND

Foams are often encountered in circumstances where their presence is not desired, and the prevention or reduction of the formation of foam is important for many applications. Thus a variety of foam-inhibiting and defoaming agents have been developed.

Foams may be caused by e.g. surfactants, proteins, fats and biocides. Different defoamers are normally required to obtain an efficient defoaming for each of the substance classes. An especially difficult type of composition to defoam is a composition comprising the biocide N,N-bis(3-aminopropyl)dodecylamine.

Propoxylates of aliphatic alcohols have earlier been used as defoaming agents.

DE 3018173 relates to highly alkaline, storage stable, and low-foaming solid cleaning compositions comprising a branched C12-022 alcohol based detergent with 5-15 PO units. An especially preferred product was stated to be C16 Guerbet alcohol reacted with 10 moles of propylene oxide.

US 2005/0215452 relates to the use of a 010 alkanol alkoxylate mixture as emulsifier, foam regulator and wetting agent. Specifically 2-propylheptanol propoxylates with up to 1.71 PO are disclosed, though products including both PO and EO units are preferred.

DESCRIPTION OF THE INVENTION

Now it has surprisingly been found that a composition comprising at least one compound having the formula (I)

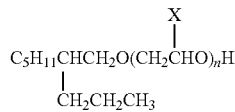

(I)

where $X=(CH_2)_aCH_3$ wherein a=0 or 1, preferably 0; and n is at least 0.5, more preferably at least 1.0, still more preferably at least 1.5, still more preferably at least 1.8, still more preferably at least 2.0, still more preferably at least 2.5, still more preferably at least 3, still more preferably at least 3.2 and most preferably at least 3.5, and at most 5, preferably at most 4.7, more preferably at most 4.5, even more preferably at most 4.3 and most preferably at most 4; and at least one hydrotrope selected from the group consisting of branched or linear $C_4$-$C_{10}$-alkyl glycosides, preferably a$_4$-$C_8$-alkyl glycosides, more preferably $C_6$-$C_8$-alkyl glycosides, even more preferably $C_8$-alkyl glycosides and most preferably branched $C_8$-alkyl glycosides; is an excellent defoaming and/or anti-foaming agent for and in solutions containing N,N-bis(3-aminopropyl)dodecylamine.

As used herein, the "term "anti-foaming" relates to (full or partial) prevention of foam formation. An anti-foaming agent or anti-foamer is thus typically added to a composition in order to prevent the formation of foam. As used herein, the term "defoaming" relates to reduction of the volume of foam. A defoaming agent or defoamer is thus typically added to a foamed composition in order to reduce the volume of the already present foam.

Hereinafter, the terms "anti-foaming" and "defoaming" will collectively be referred to as "defoaming".

The composition comprising the compounds of formula (I) and the hydrotropes is preferably an aqueous defoaming composition comprising at least one compound having formula (I) and at least one branched or linear $C_4$-$C_{10}$-alkyl glycoside.

The compounds of formula (I) are 2-propylheptanol propoxylates and butoxylates. These alkoxylates are produced by methods well known in the art, e.g. by reacting 2-propylheptanol with propylene oxide or butylene oxide, respectively, in the presence of an alkaline catalyst, such as potassium hydroxide.

An alkyl glycoside as referred to herein is a compound of the formula $C_mH_{2m+1}OG_n$, where m is a number 4-10, G is a monosaccharide residue and n is from 1 to 5. The alkyl glycoside is preferably a hexyl glycoside or an octyl glycoside, most preferably a hexyl glucoside or an octyl glucoside, where the hexyl group preferably is n-hexyl and the octyl group preferably is 2-ethylhexyl.

The defoaming compositions may optionally contain a further hydrotrope, which is anionic, such as a fatty acid soap where the acyl group contains 8-22, preferably 9-16 carbon atoms, and which could be saturated or unsaturated, linear or branched; and/or a sulfonate chosen from the group consisting of cumene sulfonate and xylene sulfonate. The further hydrotrope is preferably a fatty acid soap.

The hydrotrope/hydrotrope system described above is especially effective for the defoaming composition used in the present invention. Amphoteric and ethoxylated quaternary ammonium compounds are not so effective to use in this connection.

The weight ratio between the total amount of hydrotropes and the compound of the formula (I) is suitably from 1:1 to 7:1, normally around 5:1.

In a first aspect, the present invention relates to the inventive composition as such. In a second aspect, the present invention relates the use of the inventive composition as a as a defoaming agent for compositions comprising N,N-bis(3-aminopropyl)dodecylamine. For such uses as a defoaming agent, the inventive composition is preferably essentially free from, or comprises less than 0.01 wt % of, N,N-bis(3-aminopropyl)dodecylamine.

The invention also pertains to a low foaming disinfection composition comprising a) a compound $C_5H_{11}CH(CH_2CH_2CH_3)CH_2$—O—$(CH_2CH(X)O)_aH$ (I)
where $X=(CH_2)_aCH_3$ wherein a=0 or 1, preferably 0; and n is at least 0.5, more preferably at least 1.0, still more preferably at least 1.5, still more preferably at least 1.8, still more preferably at least 2.0, still more preferably at least 2.5, still more preferably at least 3, still more preferably at least 3.2 and most preferably at least 3.5, and at most 5, preferably at most 4.7, more preferably at most 4.5, even more preferably at most 4.3 and most preferably at most 4, such as from 1.8-5, b) at least one hydrotrope selected from the group consisting of branched or linear $C_4$-$C_{10}$-alkyl glycosides, preferably $C_4$-$C_8$-alkyl glycosides, more preferably $C_6$-$C_8$-alkyl glycosides, even more preferably $C_8$-alkyl glycosides and most preferably branched $C_8$-alkyl glycosides c) optionally one or more anionic hydrotrope selected from the group consisting of fatty acid soaps where the acyl group contains 8-22, preferably 9-18 carbon atoms, and which could be saturated or unsaturated, linear or branched; or a sulfonate chosen from the group consisting of cumene sulfonate and xylene sulfonate, and d) N,N-bis(3-aminopropyl)dodecylamine.

The above-mentioned low foaming disinfection composition normally comprises 0.02-1, preferably 0.1-1, more preferably 0.15-1 and most preferably 0.2-1% by weight of a compound of formula (I) and 1-5% by weight of hydrotrope. The weight ratio between the total amount of hydrotropes and the compound of formula (I) is suitably from 1:1 to 7:1, normally around 5:1. The amount of N,N-bis(3-aminopropyl) dodecylamine normally varies between 0.01-2% by weight based upon the weight of the composition to be defoamed, and the said composition may also contain alkali hydroxide and/or alkaline complexing agents.

It is advantageous to add a defoaming composition containing the compound of formula (I) and one or more hydrotropes to the compositions to be defoamed, instead of adding the compound of formula (I) as such. The solubility of the compounds of formula (I) is limited in aqueous solutions, especially when these contain high amounts of electrolytes, such as alkali hydroxides and alkaline complexing agents. Although it is possible on an experimental scale to add the compound of formula (I) as such, this will no longer be true on a large scale for commercial purposes.

The defoaming composition also works as a defoaming agent for a wide variety of foam developing agents, such as proteins, fats and regular surfactants, such as non-ionic, anionic, cationic or amphoteric surfactants, and biocides, but it is particularly suitable as a defoaming agent for N,N-bis(3-aminopropyl)dodecylamine. Further, it could be used in both neutral and highly alkaline compositions.

The defoaming composition of the present invention may be used in an alkaline CIP (Cleaning In Place) application, such as cleaning and disinfecting of containers in the food industry or any other industry, in formulations for the cleaning of hard surfaces, such as machine dishwashing and bottle cleaning, in a metal working formulation, in a laundry, household or other cleaning formulation, in a biocide formulation, in the preparation of paints and coatings and in their application, and in liquid cooling and process systems.

The present invention will now be illustrated by the following non-limiting examples.

General Experimental

| Notation | Products |
| --- | --- |
| 2-PH + 1.71 PO | 2-propylheptanol + 1.71 PO |
| 2-PH + 2.5 PO | 2-propylheptanol + 2.5 PO |
| 2-PH + 3.6 PO | 2-propylheptanol + 3.6 PO |
| 2-PH + 17 PO | 2-propylheptanol + 17 PO |
| 2-HD + 10 PO | 2-hexyldecanol + 10 PO |
| Ethylan 1003 | 2-propylheptanol + 3 EO |
| Ethylan 1005 | 2-propylheptanol + 5 EO |
| Berol OX 91-4 | $C_9$-$C_{11}$-alcohol + 4 EO |
| Berol AG6202 | 2-ethylhexyl glucoside |
| Triameen Y12D | N,N-bis(3-aminopropyl)dodecylamine |

Foam tests 1-4 were performed in accordance with the method EN 14371:2004, "Surface active agents—Determination of foamability and degree of foamability—Circulation test method", hereinafter referred to as the "Circulation method".

Procedure

The Circulation Method was used to foam formulations containing alkali, surfactants and defoamers—this allowed for the testing of foamability.

500 ml was added to the recirculation cylinder and the formulation was circulated 200 l/h for 10 minutes at 21° C. Measurements of the foam height were taken every 1 minute throughout the experiment. In the experiments below, the foam height is measured in mm. In the recirculation cylinder used for these experiments, a foam height measured in mm corresponds to the same value in ml (1 mm corresponds to 1 ml). All percentages are by weight.

Example 1

Foamability Tests with the Circulation Method

In this test alcohol alkoxylates without any hydrotrope was added into the solution before the circulation of the fluid started.

500 ml of formulations containing 1% NaOH, 0.033% Triameen Y12D (foamer), and 0.05% alcohol alkoxylates in water were prepared and then the circulation was started. The reference is without any alcohol alkoxylates, and the foam height is measured in mm.

TABLE 1

| minutes | reference | 2PH + 1.7PO | 2PH + 2.5PO | 2PH + 3.6PO | 2PH + 17PO | 2HD + 10PO |
| --- | --- | --- | --- | --- | --- | --- |
| 0.5 | | 30 | 40 | 55 | 60 | 50 |
| 1 | 175 | 30 | 50 | 65 | 60 | 45 |
| 2 | 225 | 15 | | 75 | 55 | 45 |
| 3 | 290 | | 30 | 80 | 50 | |
| 4 | 310 | 15 | 30 | 120 | 50 | 175 |
| 5 | 315 | 15 | 35 | 125 | 50 | |
| 6 | 320 | | 35 | 115 | 50 | 200 |
| 7 | 325 | 15 | 35 | 115 | 50 | 215 |
| 8 | 330 | 20 | 35 | 115 | 50 | 215 |
| 9 | 330 | 20 | 35 | 115 | 55 | 215 |
| 10 | 330 | 20 | 35 | 115 | 55 | 215 |

Example 2

Foamability Tests with the Circulation Method

In this test alcohol alkoxylates without any hydrotrope was added after a foam had builded up. 500 ml of a formulation containing 1% NaOH and 0.033% Triameen Y12D in water was prepared. The formulation was added to the cylinder and the recirculation was started. When the foam height was 310 mm, 0.25 g of alcohol alkoxylate was added from the top of the foam (concentration of alcohol alkoxylates in solution=0.05%).

TABLE 2

| Time min. | 2 PH + 1.7 PO | 2 PH + 2.5 PO | 2 PH + 3.6 PO | 2 PH + 17 PO Comparison | 2 HD + 10 PO Comparison |
| --- | --- | --- | --- | --- | --- |
| 0 | 310 | 310 | 310 | 310 | 310 |
| 0.5 | 80 | 80 | 170 | 190 | 180 |
| 1 | 50 | 50 | 120 | 155 | 70 |

TABLE 2-continued

| Time min. | 2 PH + 1.7 PO | 2 PH + 2.5 PO | 2 PH + 3.6 PO | 2 PH + 17 PO Comparison | 2 HD + 10 PO Comparison |
|---|---|---|---|---|---|
| 2 | 45 | 50 | 70 | 90 | 50 |
| 3 | 20 | 50 | 80 | 80 | 90 |
| 4 | 20 | 70 | 115 | 75 | 140 |
| 5 | 20 | 80 | 180 | 60 | 150 |
| 6 | 20 | 100 | 220 | 50 | 170 |
| 7 | 20 | 110 | 230 | 40 | 240 |
| 8 | 20 | 110 | 240 | 40 | 290 |
| 9 | 20 | 115 | 250 | 40 | 290 |
| 10 | 20 | 115 | 250 | 40 | 295 |

Example 3

The blends A-H of Table 3 were prepared. All alcohol alkoxylates are blended with AG 6202 as the hydrotrope. The amounts of the components are given as % by weight.

TABLE 3A

| Components | A | B | C | D | E | F | G | H |
|---|---|---|---|---|---|---|---|---|
| 2-propylheptanol + 1.71 PO | 18 | | | | | | | |
| 2-propylheptanol + 2.5 PO | | 18 | | | | | | |
| 2-propylheptanol + 3.6 PO | | | 18 | | | | | |
| 2-propylheptanol + 17 PO | | | | 18 | | | | |
| 2-hexyldecanol + 10PO | | | | | 18 | | | |
| Ethylan 1003 | | | | | | 18 | | |
| Ethylan 1005 | | | | | | | 18 | |
| Berol OX 91-4 | | | | | | | | 18 |
| AG6202 | 82 | 82 | 82 | 82 | 82 | 82 | 82 | 82 |

All blends are clear

Aqueous Composition 1
  7% of the blends A-H (see Table 3A)
  12.5% NaOH
  12.5% Na$_4$EDTA
  68% water
Aqueous Composition 2
  4% of aqueous composition 1
  96% water
The solution is now containing 1% alkalines and 0.05% defoamer.
Triameen Y12D is mixed into the solution before recirculation in an amount that yields a concentration of 0.033% in the solution.
Composition 2 was circulated and the amount of foam generated is given in mm for all compositions at the points of time indicated (see Table 3B).

TABLE 3B

| Time min. | A[b] | B | C | D (Comp)[a] | E (Comp)[a] | F (Comp)[a] | G (Comp)[a] | H (Comp)[a] |
|---|---|---|---|---|---|---|---|---|
| 0.5 | 18 | 28 | 25 | 80 | 50 | 90 | 180 | 160 |
| 1 | 20 | 35 | 30 | 90 | 50 | 140 | 270 | 260 |
| 2 | 20 | 40 | 35 | 85 | 50 | 230 | 350 | 360* |
| 3 | 20 | 45 | 40 | 80 | 45 | 260 | 360* | |
| 4 | | 45 | 42 | 80 | 50 | 300 | | |
| 5 | 23 | 45 | | 80 | | | | |
| 6 | | 45 | 45 | 80 | 55 | 360* | | |
| 7 | 27 | 45 | 45 | 80 | | 360 | | |
| 8 | 30 | 45 | 45 | 80 | 55 | 360 | | |
| 9 | 30 | 45 | 45 | 80 | | 360 | | |
| 10 | 30 | 45 | 45 | 80 | 55 | 360 | | |

[a]Comp = comparison
[b]A-H denote aqueous compositions 2, as defined above, containing the blends A-H as defined in Table 3A.
*360 mm = full cylinder From Table 3B it is evident that the defoaming compositions according to the invention (A-C) are more effective than the comparison compositions (D-H) comprising products with more propyleneoxy units or ethoxylated products.

Example 4

The following compositions were prepared:

TABLE 4A

| | D | D1 | D2 | C | C2 |
|---|---|---|---|---|---|
| 2-propylheptanol + 17 PO | 18 | 9 | 4.5 | | |
| 2-propylheptanol + 3.6 PO | | | | 18 | 4.5 |
| AG6202 | 82 | 91 | 95.5 | 82 | 95.5 |

All blends of alcohol alkoxylate and hydrotrope are clear, but the addition of D and D1 to the formulations containing alkali and Triameen Y12D produced cloudy formulations, and the relative amount of the alcohol alkoxylate was therefore reduced to obtain formulations that were clear (D2). Although the addition of C did not produce cloudy formulations, a formulation with the same weight ratio between hydrotrope and alcohol alkoxylate (C2) was prepared for comparison.
Composition 1
  28% D2 or C2
  12.% NaOH
  12.% EDTA
  47% water
Composition 2
  4% of composition 1
  0.033% (active content) Triameen Y12D
(the formulation contains 1% alkalines, 1.1% hydrotrope and 0.05% alcohol alkoxylate)
The compositions 2 were circulated

TABLE 4B

| Time (min) | D2* | C2* |
|---|---|---|
| 0 | | |
| 0.5 | 60 | 25 |
| 1 | 70 | 30 |
| 2 | 90 | 30 |
| 3 | 110 | 35 |
| 4 | 120 | 35 |
| 5 | 130 | 35 |
| 6 | | 35 |

TABLE 4B-continued

| Time (min) | D2* | C2* |
|---|---|---|
| 7 | 150 | |
| 8 | 170 | 35 |
| 10 | 170 | 35 |

*D2 and C2 denote aqueous compositions 2, as defined above, containing the blends D2 and C2 respectively, as defined in Table 4A.

The higher amount of hydrotrope did not have any detrimental effect on C2.

Example 5

A low foam biocide formulation was prepared:

2.4% AG6202

0.64% Isononanoic acid

1% 2-propylheptanol+3.5EO

1% Triameen Y12D

16% NaOH

14% EDTA balance water

A solution containing 3% of the biocide formulation above was prepared, and this solution was circulated at a flow rate of 200 l/h at a temperature of 60° C.

TABLE 5

| Time | Foam height |
|---|---|
| 0 min | 3 cm |
| 20 min | 3 cm |

2-Propylheptanol+3.5 PO in the presence of a mixture of an alkyl glycoside and an anionic hydrotrope according to the invention were able to maintain the foam height at the start value during a period of 20 minutes.

The invention claimed is:

1. A composition comprising a compound of formula (I):

$$C_5H_{11}CH(CH_2CH_2CH_3)CH_2O(CH_2CH(X)O)_nH \qquad (I)$$

where $X=(CH_2)_aCH_3$ where a=0 or 1 and where n=0.5-5; one or more hydrotropes selected from the group consisting of branched or linear C4-C10 alkyl glycosides; and N,N-bis(3-aminopropyl)dodecylamine.

2. A composition according to claim 1 where the hydrotrope is n-hexyl glucoside or 2-ethylhexyl glucoside.

3. A composition according to claim 1 which contains less than 0.01 wt % of, N,N-bis(3-aminopropyl)dodecylamine.

4. The composition of claim 1, wherein said composition is an alkaline Cleaning In Place (CIP) formulation, hard surface cleaning formulation, a biocide formulation, a laundry formulation, a household cleaning formulation, a metal working formulation, or in a paint or coating formulation.

* * * * *